(12) United States Patent
Terada et al.

(10) Patent No.: US 6,710,555 B1
(45) Date of Patent: Mar. 23, 2004

(54) DISCHARGE LAMP LIGHTING CIRCUIT WITH PROTECTION CIRCUIT

(75) Inventors: Ryu Terada, Iwata-gun (JP); Shunsuke Kamimura, Iwata-gun (JP); Shinichi Suzuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/400,431

(22) Filed: Mar. 28, 2003

(30) Foreign Application Priority Data

Aug. 28, 2002 (JP) ........................................ 2002-248687

(51) Int. Cl.$^7$ ................................................ G05F 1/00
(52) U.S. Cl. ........................ 315/291; 315/307; 315/274; 315/224
(58) Field of Search ................................. 315/291, 307, 315/308, 274, 279, 224, 225, 219, 247

(56) References Cited

U.S. PATENT DOCUMENTS 5,869,935 A * 2/1999 Sodhi .......................... 315/225
5,883,473 A * 3/1999 Li et al. ....................... 315/225

FOREIGN PATENT DOCUMENTS

JP         10-41081 A        2/1998

* cited by examiner

*Primary Examiner*—Tuyet T. Vo
(74) *Attorney, Agent, or Firm*—Oliff & Berridge, PLC (57) ABSTRACT

A discharge lamp lighting circuit includes an open-circuit protection means to protect a driving means when a discharge lamp is not lighted. The open-circuit protection means is adapted to send out to a control means a signal for limiting a current flowing in the driving means to or below a predetermined value when the tube current is equal to or lower than a first value predetermined, and a signal for sequentially increasing a current flowing in the driving means up to a rated current when the tube current is higher than the first value and also is equal to or lower than a second value predetermined, and to stop a driving signal sent from the control means when a tube current flowing in the discharge lamp has a value equal to or lower than the first value after a predetermined time.

5 Claims, 4 Drawing Sheets

DISCHARGE LAMP LIGHTING CIRCUIT WITH PROTECTION CIRCUIT

BACKGROUND OF THE INVENTION

1. Field of the Invention

The present invention relates to a discharge lamp lighting circuit, and more specifically to a discharge lamp lighting circuit provided with protection circuit to prevent breakdown of a semi-conductor switching element use in a driving transformer.

2. Description of the Related Art

A discharge lamp, especially a rare-gas discharge lamp for use in various scanners and lighting devices is often lighted by a high frequency voltage obtained by switching a DC power source. The voltage waveform induced in a transformer is oscillated by a resonant circuit composed of an inductance of the transformer and a stray capacitance at the time of switching, and the voltage to be applied to the semi-conductor for driving and the secondary voltage of the transformer rise. Especially, when a rare-gas discharge lamp is not connected or not lighted, the load is light, and therefore the primary voltage of the transformer rises further thereby possibly destroying the semi-conductor for driving, and at the same time the secondary voltage of the transformer also rises further generating continuously a high voltage equivalent to the starting voltage, which may result in dielectric breakdown of the transformer.

In order to overcome the above problem, a discharge lamp lighting device has been disclosed in Japanese Patent Application Laid-open No. Hei 10-41081. The discharge lamp lighting device disclosed utilizes resonant oscillation for pulse lighting, stabilizes a power supply voltage thereby stabilizing luminance of a fluorescent lamp, and is provided with a protection means working when the fluorescent lamp is not connected or not lighted. The protection means functions such that a current flowing in the discharge lamp is detected by a lamp current detecting means thereby stopping the driving of the switching element when the discharge lamp is not connected or not lighted.

Figure 5:
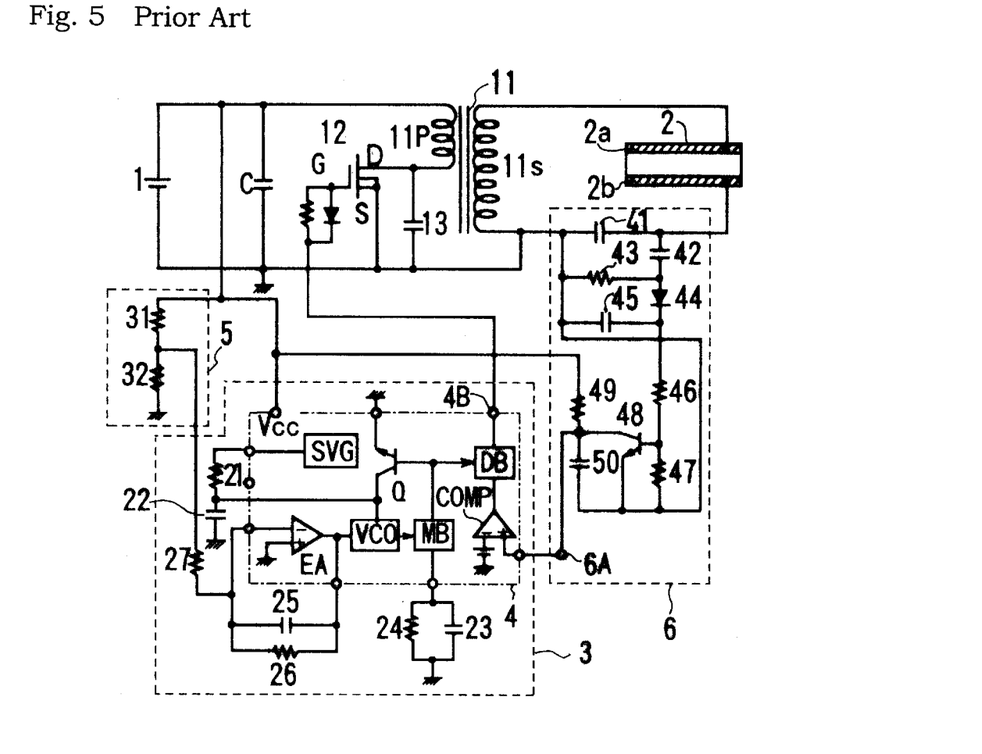
FIG. 5 is a circuit diagram of a conventional discharge lamp lighting device.

FIG. 5 is a circuit diagram of the conventional discharge lamp lighting device above described. The discharge lamp lighting device includes a voltage oscillation type inverter of one transistor (hereinafter referred to as inverter) and is connected to both electrodes of a DC power supply 1 which outputs a voltage Vi. A discharge lamp (hereinafter referred to as fluorescent lamp) 2 has a rare gas, such as xenon, filled therein as a discharge gas and has fluorescent material coated on the inner wall of its glass tube. An equivalent circuit, when the fluorescent lamp 2 is lighted, can be shown as a series circuit consisting of a resistor and an interelectrode capacitance. Referring to FIG. 5, the inverter comprises: a step-up transformer 11 having a step-up ratio of N and including a primary winding 11p and a secondary winding 11s; a switching element 12 (power MOSFET) connected to the primary winding 11p; a resonant capacitor 13 connected in parallel to the switching element 12; and a switching control circuit 3. A pair of electrodes 2a and 2b of the fluorescent lamp 2 are connected to the secondary winding 11s, that is, to respective output terminals of the inverter.

At a primary side of the step-up transformer 11, a series resonant circuit is formed by a primary inductance (inductance of the primary winding 11p), and by a sum of a capacitance of the resonant capacitor 13, an output capacitance Coss (not shown) of the switching element 12 and an interelectrode capacitance (not shown) of the fluorescent lamp 2 converted to the primary side. The series resonant circuit has its resonant cycle set to be shorter than an off-time Toff of the switching element 12. The off-time Toff is controlled to be constant always. The switching control circuit 3, which comprises a switching control IC 4 for the inverter, a plurality of resistors and a plurality of capacitors, is connected to a gate terminal of the switching element 12, and the switching element 12 is driven by a switching control signal outputted from an output terminal 4B of the switching control IC 4, whereby the inverter is operated. A voltage detecting circuit 5, which detects the voltage Vin of the DC power supply 1, is connected to the switching control circuit 3.

The structure and operation of a lamp current detecting circuit 6 and a protection circuit (comparator COMP provided in the switching IC 4) will be described hereafter. The lamp current detecting circuit 6 detects a lamp current flowing in a capacitor 41 by causing the lamp current to flow to a resistor 43 via a capacitor 42 thereby converting into a voltage, and the voltage is rectified by a diode 44, smoothed by a capacitor 45, divided by resistors 46 and 47, and inputted to a base of a transistor 48. A resistor 49 and a capacitor 50 are connected to a collector of the transistor 48, that is, to an output terminal 6A, and the resistor 49 has its other end connected to the DC power supply 1 thereby supplying a voltage to the collector of the transistor 48. When the lamp current is zero, the transistor 48 has a base voltage of zero and therefore is in an "off state". Consequently, the capacitor 50 is charged by the DC power supply 1 via the resistor 49, and the voltage at the output terminal 6A increases and gets at a voltage equal to a power supply voltage Vin when a delay time Td (for example, 5 seconds) elapses, which is determined by the values of the resistor 49 and the capacitor 50. And, when the lamp current is flowing, the transistor 48 has its base supplied with a voltage and therefore is in an "on state", and the output terminal 6A has a voltage of zero.

The protection circuit comprises the aforementioned comparator COMP provided in the switching control IC 4. The comparator COMP has its non-inverting input terminal connected to the output terminal 6A of the lamp current detecting circuit 6 and has its inverting terminal supplied with a reference voltage. The reference voltage is lower than the power supply voltage Vin. An output of the comparator COMP is connected to a driver DB. The driver DB is controlled such that when the voltage at the non-inverting terminal of the comparator COMP is higher than the reference voltage, the output of the comparator COMP goes up to a high level so as to stop the operation of the driver DB, whereby the switching control signal is held at a low level causing the inverter to stop its operation, and such that when the voltage at the non-inverting terminal of the comparator COMP is lower than the reference voltage, the output of the comparator COMP goes down to a low level so as to have no impact on the operation of the driver DB causing the inverter to operate normally.

The operation of the circuit depending on the presence/absence of the lamp current will be described. Referring to FIG. 5, when the fluorescent lamp 2 is not connected or not lighted, the lamp current is zero, therefore when the delay time Td elapses, the voltage at the output terminal 6A of the lamp current detecting circuit 6, that is the voltage at the non-inverting input terminal of the comparator COMP, becomes equal to the power supply voltage Vin thereby causing the output of the comparator COMP to cease. At the very start of supplying power, the fluorescent lamp 2 connected is not lighted, and therefore the lamp current is zero, but due to the delay time Td of the lamp current detecting circuit 6 the driver DB does not cease its operation in the immediate wake of starting power supply, and if the fluorescent lamp 2 is lighted within the delay time Td, the inverter operates normally. That is to say, when the lamp current is flowing at the normal operation, the voltage at the output terminal 6A of the lamp current detecting circuit 6, that is the voltage at the non-inverting input terminal of the comparator COMP, is zero, whereby the output of the comparator COMP goes down to a low level and the inverter operates normally.

Figure 6A:
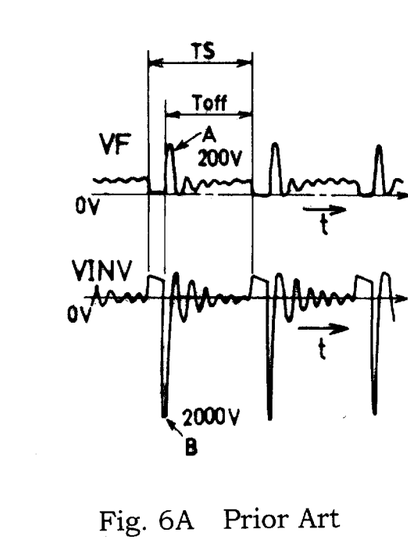
FIGS. 6A and 6B show a voltage between a source terminal and a drain terminal of a switching element of FIG. 5, and an output voltage of an inverter of FIG. 5, respectively referring to when a discharge lamp is lighted normally, and when the discharge lamp is not connected or not lighted.
Figure 6B:
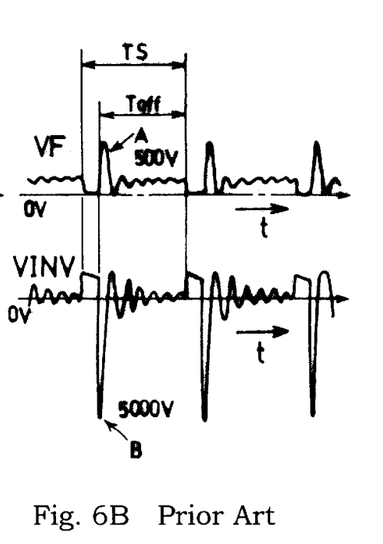

FIGS. 6A and 6B show a voltage VF between a source terminal S and a drain terminal D of the switching element 12, and an output voltage VINV of the inverter, respectively referring to when the fluorescent lamp 2 is lighted normally, and when the fluorescent lamp 2 is not connected or not lighted, where the horizontal axis represents a time, and the vertical axis represents the voltage VF and the output voltage VINF, and where TS is a time of one cycle, and Toff is a time for which the fluorescent lamp 2 is out. Referring to FIG. 6A, when the fluorescent lamp 2 is lighted normally, the voltage VF is approximately 200 V at a point A and the output voltage VINV is approximately 2000 V at a point B, and referring to 6B, when the fluorescent lamp 2 is not connected or not lighted, the voltage VF is approximately 500 V at the point A and the output voltage VINV is approximately 5000 V at the point B.

The discharge lamp lighting device disclosed in Japanese Patent Application Laid-open No. Hei 10-41081 has the following problem. When the fluorescent lamp 2 is not connected or not lighted, the voltage VF increases to approximately 500 V at the point A and the output voltage VINV increases to approximately 5000 V at the point B, exceeding the withstanding pressure of the switching element 12, which may result in destroying the switching element 12. To prevent the destruction, the switching element 12 is adapted to cease its operation after a predetermined time (5 seconds) when the discharge lamp 2 is not connected or not lighted, but a stress of a high voltage is applied to the switching element 12 and the step-up transformer 11 for the predetermined time, and therefore it may happen that the switching element 12 and the step-up transformer 11 suffer dielectric breakdown or insulation failure.

SUMMARY OF THE INVENTION

The present invention has been made in light of the above problem, and it is an object of the present invention to provide a discharge lamp lighting circuit including a protection circuit to prevent breakage of the circuit when a rare-gas discharge lamp is not connected or not lighted.

In order to achieve the object, according to a first aspect of the present invention, a discharge lamp lighting circuit comprises: a driving means to send out a signal for lighting a discharge lamp; a short-circuit protection means to protect the driving means when the discharge lamp is shorted; an open-circuit protection means to protect the driving means when the discharge lamp is not lighted; and a control means to control the driving means according to a signal sent from the short-circuit protection means and the open-circuit protection means. The open-circuit protection means of the discharge lamp lighting circuit is adapted to send out to the control means a signal for limiting a current flowing in the driving means to or below a predetermined value when the tube current is equal to or lower than a first value predetermined, and a signal for sequentially increasing a current flowing in the driving means up to a rated current when the tube current is higher than the first value and also is equal to or lower than a second value predetermined, and adapted to stop a driving signal sent from the control means when a tube current flowing in the discharge lamp has a value equal to or lower than the first value after a predetermined time.

According to a second aspect of the present invention, in the discharge lamp lighting circuit of the first aspect, the open-circuit protection means includes: a current detecting means to detect a tube current flowing in the discharge lamp; a current changing means to operate according to the outcome of detection by the current detecting means thereby changing the tube current flowing in the discharge lamp; and a minimum current detecting means to start its operation at a predetermined time after the outcome of detection by the current detecting means is determined. A signal for limiting the current flowing in the driving means to or below a predetermined value is sent by the open-circuit protection means to the control means according to the outcome of detection by the current changing means, and a signal for stopping a driving signal sent from the control means is sent by the open-circuit protection means to the control means according to the outcome of detection by the minimum current detecting means after a predetermined time.

According to a third aspect of the present invention, in the discharge lamp lighting circuit of the first aspect, the current changing means sends to the control means a signal for driving the driving means by changing at least one of a duty ratio and a frequency of a pulse signal sent out from the control means thereby increasing the tube current when the tube current is equal to or higher than the first value and also is equal to or lower than the second value, and a signal for stopping the tube current from increasing when the tube current reaches a predetermined value.

According to a fourth aspect of the present invention, in the discharge lamp lighting circuit of the first aspect, the driving means includes a DC power supply, a switching element to turn on and off a current flowing from the DC power supply, and a transformer having its primary winding connected in series to the switching element, and the current detecting means includes a means to convert into a DC voltage an AC voltage between the both ends of a resistor connected in series to a secondary winding of the transformer and the discharge lamp.

According to a fifth aspect of the present invention, in the discharge lamp lighting circuit of the first aspect, the short-circuit protection means sends out to the control means a signal for stopping the driving signal sent from the control signal when a tube current flowing in the discharge lamp exceeds a predetermined value according to the outcome of detection by the current detecting means.

Consequently, when the discharge lamp is not lighted or not connected, the current flowing in the driving means is reduced to a low level thereby limiting a voltage generated at the time of turning off a driving circuit, and when a current flowing in the discharge lamp is equal to or lower than the predetermined value, a pulse signal sent from the driving means is stopped after a predetermine time thereby preventing breakdown of the driving circuit.

DETAILED DESCRIPTION OF THE PREFERRED EMBODIMENTS

Figure 1:
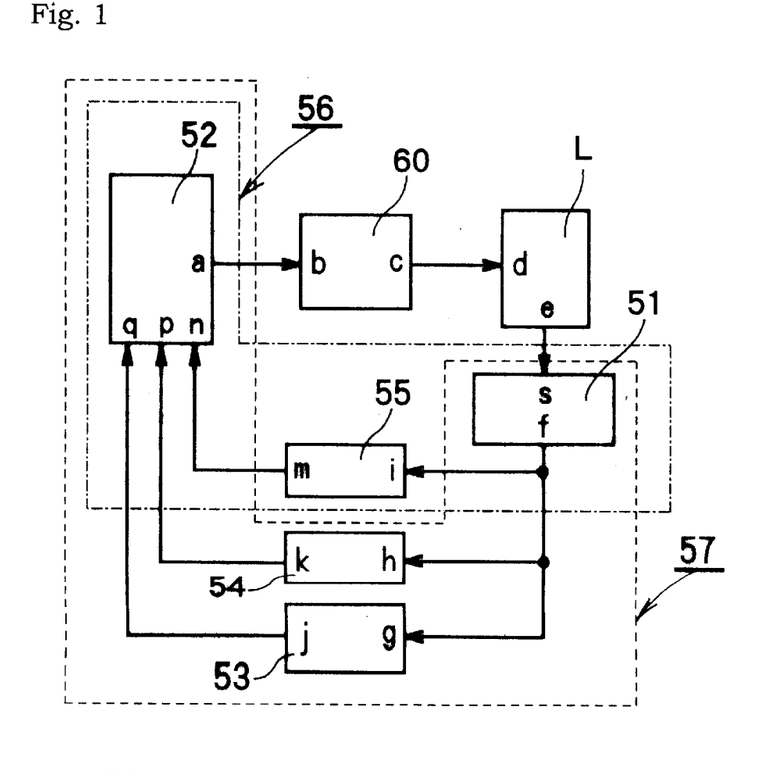
FIG. 1 is a block diagram of a discharge lamp lighting circuit according to the present invention.

A discharge lamp lighting circuit of the present invention will be described with reference to FIGS. 1 to 4B. Referring to FIG. 1, the discharge lamp lighting circuit comprises: a control means 52; a driving means 60; a discharge lamp L; a current detecting means 51 to detect a tube current flowing in the discharge lamp L; a current changing means 53 to operate according to the outcome of detection by the current detecting means 51 thereby changing the tube current; a minimum current detecting means 54 to operate at a predetermined time Td after the outcome of detection by the current detecting means 51 is determined; and a maximum current detecting means 55. The discharge lamp L is a rare-gas discharge lamp, such as a fluorescent lamp and a xenon lamp. The driving means 60 is composed, for example, of a DC power supply, a switching element which switches on and off a current flowing from the DC power supply, and a transformer whose primary winding is connected in series to the switching element. An open-circuit protection means 57 to operate when the discharge lamp L is not lighted is composed of the current detecting means 51, the current changing means 53, the minimum current detecting means 54, and the control means 52. And a short-circuit protection means 56 is composed of the maximum current detecting means 55, the current detecting means 51, and the control means 52. An output terminal a of the control means 52 is connected to an input terminal b of the driving means 60, and an output terminal c of the driving means 60 is connected to a terminal d of the discharge lamp L. A terminal e of the discharge lamp L is connected to an input terminal s of the current detecting means 51 which detects a tube current flowing in the discharge lamp L, and an output terminal f of the current detecting means 51 is connected to respective input terminals g, h and i of the current changing means 53, the minimum current detecting means 54 and maximum current detecting means 55. Output terminals j, k and m of the current changing means 51, the minimum current detecting means 54 and the maximum current detecting means 55 are connected respectively to input terminals n, p and q of the control means 52.

Figure 2:
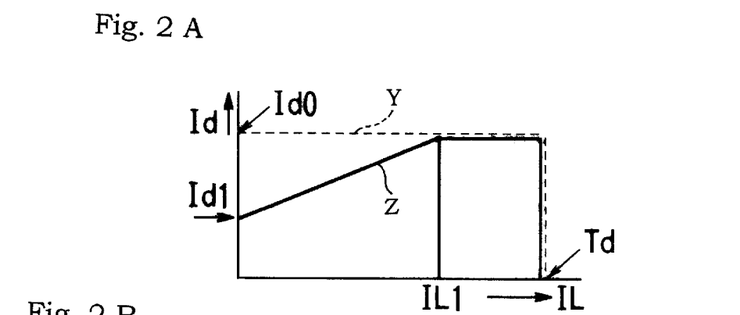
FIGS. 2A and 2B are explanatory diagrams for a protection means provided in the discharge lamp lighting circuit of the present invention and adapted to operate when a discharge lamp is not lighted, respectively referring to when the discharge lamp is lighted normally, and when the discharge lamp is not connected or not lighted.

The operation of the discharge lamp lighting circuit shown in FIG. 1 will be described with reference to FIGS. 2A and 2B, which are explanatory diagrams for the open-circuit protection means 57, and in which Y refers to the conventional sample shown in FIG. 5, and Z refers to the embodiment of the present invention. In FIG. 2A, the vertical axis represents a current Id flowing in the driving means 60 and the horizontal axis represents a tube current IL when the discharge lamp L is lighted normally, and in FIG. 2B, the vertical axis represents a current Id flowing in the driving means 60 and the horizontal axis represents time when the discharge lamp L is not connected or not lighted. When power (not shown) is supplied to the control means 52, a pulse signal with a predetermined cycle is generated at the output terminal a, and a predetermined voltage is applied to the discharge lamp L by the driving means 60. When the discharge lamp L is lighted, the tube current IL does not flow, so the current detecting means 51 has an output of zero. Consequently, the current changing means 53 to change the tube current IL flowing in the discharge lamp L and the minimum current detecting means 54 operate together.

The operation at the time when the discharge lamp L is lighted normally will be described with reference to FIG. 2A. When power is supplied, the current detecting means 51 has an output of zero while the tube current IL is not flowing in the discharge lamp L. As a result, a signal indicating the output of current detecting means 51 is zero is sent from the current changing means 53 to the input terminal q of the control means 52. The control means 52 receives the signal and outputs to the driving means 60 a pulse signal with a cycle to limit the current Id flowing in the driving means 60 to or below a predetermined current Id 1 as shown by Z in FIG. 2A. When the discharge lamp L is lighted by the output of the driving means 60 and the tube current is caused to flow therein, the output of the current detecting means 51 is no longer zero whereby the current changing means 53 sends to the control means 52 a signal for causing the tube current corresponding to the output of the current detecting means 51 to flow in the discharge lamp L. The current changing means 53 sends to the control means 52 a signal for sequentially increasing the current Id flowing in the driving means 60, that is the tube current IL flowing in the discharge lamp L, until the tube current IL reaches a predetermined value IL1. When the tube current IL gets at the rated current IL1 predetermined, the discharge lamp L is lighted at a rated value, and the current changing means 53 ceases its operation.

As described above, the current Id flowing in the driving means 60 is the tube current IL as low as just enough to keep-the discharge lamp L lighted normally when the discharge lamp is lighted. Consequently, in the driving means 60 comprising the transformer having its primary winding connected in series to the switching element, the current Id flowing in the driving means 60 can be reduced to a lower level until the tube current IL reaches the predetermined value IL1, compared with when a certain level of a large current ID0 is caused to flow in the driving means 60 from the beginning as shown by Y showing the conventional sample. As a result, the voltage generated when the switching element is turned on and off can be held down to a low level.

In case of the discharge lamp L being shorted, when power is supplied, a large current flows, and the current detecting means 51 determines the current has a higher value than a predetermined value. Consequently, the maximum current detecting means 55 starts operating whereby the short-circuit protection means 56 operates as follows. When the tube current IL exceeds a predetermined value while the discharge lamp L is lighted, the maximum current detecting means 55 sends a signal to the input terminal n of the control means 52. When the control means 52 receives the signal, the control means 52 stops the aforementioned pulse signal sent to the driving means 60, whereby the driving means 60 can be protected from excessive large current generated due to the discharge lamp L being shorted.

The operation in case of the discharge lamp L being not lighted or not connected to the driving means 60 will be described with reference to FIG. 2B. In this case, the tube current IL does not flow, and the minimum current detecting means 54 starts its operation at a predetermined time Td after the outcome of the detection by the current detecting means 51 is determined, whereby s signal T is sent to the input terminal p of the control means 52. When the control means 52 receives the signal T, the control means 52 stops the pulse signal sent from the driving means 60, whereby the switching element and the transformer connected in series thereto can be prevented from getting damaged.

Figure 3:
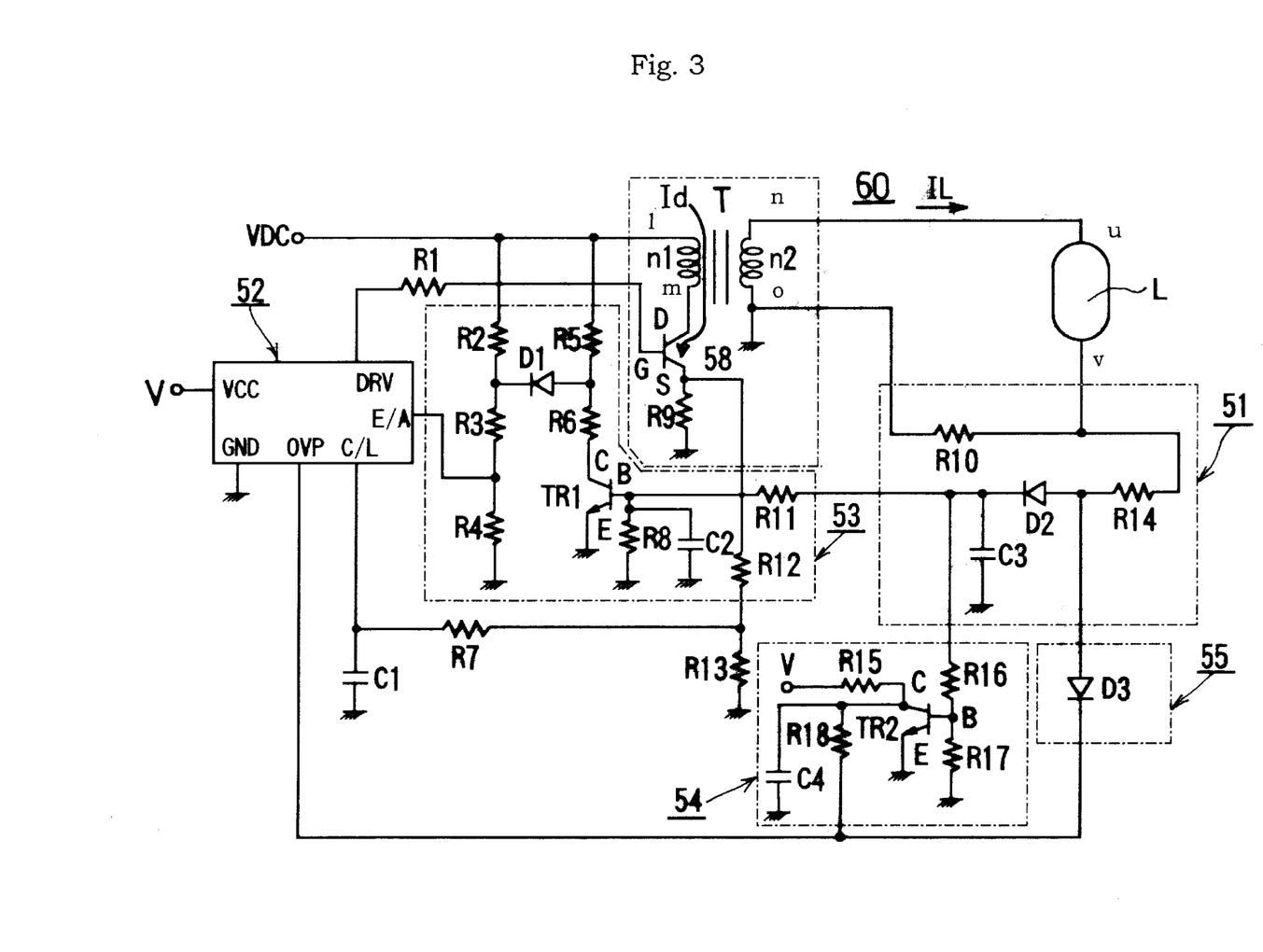
FIG. 3 is a diagram of the discharge lamp lighting circuit of FIG. 1.

An embodiment of the discharge lamp lighting circuit shown in FIG. 1 will be described with reference to FIG. 3. In explaining the embodiment of FIG. 3, any portions corresponding to those in FIG. 1 are denoted by the same reference numerals, and a detailed description thereof will be omitted. In FIG. 3, corresponding to the control means 52 in FIG. 1 is an LSI, for example TK75020M (product name). Hereinafter, the LSI TK75020M is referred to as control circuit 52. Terminals of the control circuit 52 of FIG. 3 correspond in function to the terminals of the control means 52 of FIG. 1 as follows: a terminal OVP to the terminals n and p, a terminal E/A to the terminal q, and a terminal DRV to the terminal a. And a current Id flowing in an FET 58 as a switching means is converted into a voltage and applied to a terminal C/L. The voltage functions to output a predetermined pulse signal at the terminal DRV. Specifically, the pulse signal is outputted from the terminal DRV of the control circuit 52 with its duty ratio and/or frequency varied such that the discharge lamp L is out for a constant time and is lighted for a variable time. A terminal VCC is supplied with a DC voltage V, and a terminal DND is grounded.

The driving means 60 is composed of the aforementioned FET 58, a transformer T, and a resistor R9. A terminal l of the transformer T is connected to a DC power supply (not shown) of a voltage VDC. A terminal m of a primary winding n1 of the transformer T is connected to a drain terminal D of the FET 58 which turns on and off a current Id flowing from the DC power supply. A source terminal S of the FET 58 is grounded via the resistor R9. A voltage between both ends of the resistor R9 is divided by resistors R12 and 13, and the resistor R9 is connected to the terminal C/L of the control circuit 52 via a resistor R7. The terminal C/L is grounded via a capacitor C1 so as to be filtered. A gate terminal G of the FET 58 is connected to the terminal DRV of the control circuit 52 via a resistor R1 and is supplied with the aforementioned pulse signal. One terminal n of a secondary winding n2 of the transformer T is connected to one end u of the discharge lamp L, and the other terminal o thereof is connected to one end of a resistor R10 and also grounded.

The current detecting means 51 is composed of the resistor R10, a resistor R14, a diode D2, and a capacitor C3. An AC voltage between both ends of the resistor R10 connected in series to the secondary winding n2 of the transformer T and the discharge lamp L is converted into a DC voltage. The maximum current detecting means 55 is composed of a diode D3. The other end of the resistor 10 is connected to the other end v of the discharge lamp L and one end of the resistor R14. The other end of the resistor R14 is connected to respective anode terminals of the diodes D2 and D3. A cathode terminal of the diode D3 is connected to the terminal OVP of the control circuit 52. A cathode terminal of the diode D2 is connected to respective one ends of resistors R11 and R16 and the capacitor 3C.

The current changing means 53 is structured as follows. The other end of the resistor R11 connected to the cathode terminal of the diode D2 is connected to a base terminal B of a transistor TR1, and the transistor TR1 has its collector terminal C connected to one end of a resistor R6, and has its emitter terminal E grounded. The base terminal B is grounded via a resistor R8 and a capacitor C2. The other end of the resistor R6 is connected to an anode terminal of a diode D1 and one end of a resistor R5. A cathode terminal of the diode D1 is connected to respective one ends of resistors R2 and R3. The other end of the resistor R3 is grounded via a resistor R4. The other ends of the resistors R2 and R5 are connected to the DC power supply VDC. A connection between the resistors R3 and R4 is connected to the terminal E/A of the control circuit 52.

The minimum current detecting means 54 is structured as follows. The other end of the resistor R16 connected to the cathode terminal of the diode D2 is connected to a base terminal B of a transistor TR2, a collector terminal C of the transistor TR2 is connected to one end of a resistor R15, the other end of the resistor R15 is supplied with a voltage V, and an emitter terminal E of the transistor TR2 is grounded. The base terminal B is grounded via a resistor R17. The collector terminal C is connected to respective one ends of a resistor R18 and a capacitor C4. The other end of the capacitor C4 is grounded. The other end of the resistor R18 is connected to the cathode terminal of the diode D3 and the terminal OVP of the control circuit 52 as well. Consequently, either the maximum current detecting means 55 or the minimum current detecting means 54 is adapted to operate. The terminal OVP of the control circuit 52 has sufficiently high input impedance, and the resistor R15 and the capacitor C4 have their respective time constants set to determine an operation time Td of the minimum current detecting means 54.

The operations of the driving means 60, the current detecting means 51, the current changing means 53, the minimum current detecting means 54, and the maximum current detecting means 55 of the discharge lamp lighting circuit shown in FIG. 3 will be described.

The driving means 60 is composed of the FET 58 and transformer T, and conducts while the gate terminal G of the FET 58 is supplied with a voltage thereby supplying a current to the primary winding n1 of the transformer T. The transformer T is a step-up transformer, and steps up a voltage at a ratio of the primary winding n1 to the secondary winding n2 to provide the discharge lamp L with a tube current IL.

In the current detecting means 51, when the discharge lamp L is lighted causing the tube current IL to flow, an AC voltage between the both ends of the resistor R10 connected in series to the secondary winding n2 of the transformer T and the discharge lamp L is converted into a DC voltage by the diode D2, the capacitor C3 and the diode D3, respectively.

In the current changing means 53, if the tube current IL is not detected by the current detecting means 51 when the discharge lamp L is lighted, the transistor TR1 does not conduct, but the diode D1 conducts causing a potential to increase at the connection between the resistors R5 and R6, and also at the terminal E/A of the control circuit 52. The potential at the terminal E/A of the control circuit 52, which is determined by the resistors R2, R3, R4 and R5 and the voltage VDC, is set to send from the terminal DRV of the control circuit 52 a pulse signal causing a tube current IL to flow, which is as low as required just to light the discharge lamp L normally.

If the tube current IL flows as above described and has its value determined by the current detecting means 51, the transistor TR1 conducts, then the potential lowers at the connection between the resistors R5 and R6 and also at the terminal E/A of the control circuit 52. The current changing means 53 sends to the control circuit 52 a signal for sequentially increasing the current Id flowing in the driving means 60, that is the tube current IL flowing in the discharge lamp L, until the tube current IL reaches a predetermined current IL1. When the tube current IL gets at the predetermined current IL1, the diode D1 does not conduct, then the discharge lamp L is lighted at a rated value causing the current changing means 53 to cease its operation.

The minimum current detecting means 54 operates when the discharge lamp L is out or not connected to the driving means 60. When power is supplied and the current detecting means 51 has an output (cathode voltage of the diode D2) of zero, the transistor TR2 does not conduct, then a potential of the capacitor C4 rises at a time determined by the resistor R15, the capacitor C4 and the DC voltage V. The control circuit 52 includes a comparison circuit (not shown) which operates when a voltage at the input terminal OVP (corresponding to the input terminal p of the control means 52 in FIG. 1) reaches a predetermined value at a predetermined time Td after the outcome of detection by the current detecting means 51 is determined, and if the comparison circuit operates, the pulse signal sent from the driving means 60 is stopped. Thus, the switching element and the transformer connected in series thereto are prevented from getting damaged. The comparison circuit, which is integrally included in the control circuit 52 as above described, may alternatively be separately provided such that an output of the minimum current detecting means 54, that is a voltage between both ends of the capacitor C4, is connected to one input terminal of the comparison circuit and is compared with a reference voltage connected to the other input terminal of the comparison circuit, and that the pulse signal sent from the driving means 60 is stopped by the output of the comparison circuit.

The maximum current detecting means 55 operates when the discharge lamp L is shorted. When power is supplied, and if the current detecting means 51 determines a voltage at the resistor R14 and the anode terminal of the diode 2 exceeds a predetermined value, the diode D3 as the maximum current detecting means 55 conducts, whereby the a signal is sent to the terminal OVP of the control circuit 52. When the control circuit 52 receives the signal, the control circuit 52 stops the pulse signal sent from the driving means 60, whereby the driving means 60 is protected from a excessive large current generated due to the discharge lamp L being shorted. In this case, since the transistor TR2 of the minimum current detecting means 54 conducts and since one end of the resistor R18 is grounded, a signal is not sent to the resistor R18 connected to the cathode terminal of the diode D3.

Figure 4:
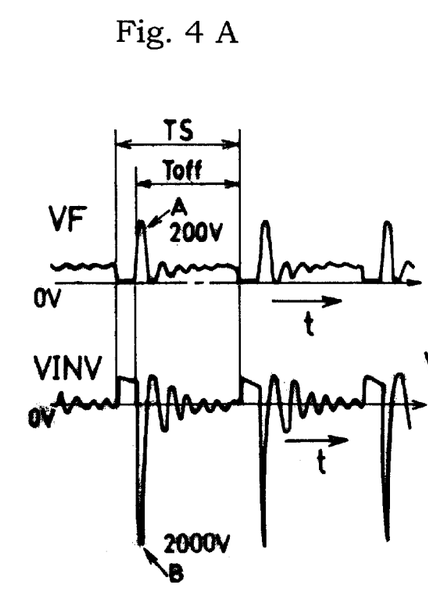
FIGS. 4A and 4B show a voltage between a source terminal and a drain terminal of an FET, and an output voltage between both terminals of a secondary winding n2 of a transformer shown in FIG. 3, respectively referring to when the discharge lamp is lighted normally, and when the discharge lamp is not connected or not lighted.

In FIGS. 4A and 4B, the horizontal axis represents a time, and the vertical axis represents a voltage VF between the source terminal S and the drain terminal D of the FET 58 and an output voltage VINV between the both terminals n and o of the secondary winding n2 of the transformer T shown in FIG. 3, where TS is a time of one cycle and Toff is a time during which the discharge lamp L is out. Referring to FIG. 4A, when the discharge lamp L is lighted normally, the voltage VF is approximately 200 V at a point A, and the output voltage VINV is approximately 2000 V at a point B. Referring to FIG. 4B, when the discharge lamp L is not connected or not lighted, the voltage VF is approximately 400 V at the point A, and the output voltage VINV is approximately 4000 V at the point B. Here, the voltage VF and the output voltage VINV are reduced to ⅕ of respective voltages VF and VINF discussed in FIG. 6B. Since the voltage VF and the output voltage VINV described in FIG. 4B are proportional to the current flowing in the FET 58, the voltage VF and the output voltage VINF at the points A and B can be changed by changing a value of the current flowing in the FET 58, specifically such that the value of the resistor R5 of the current detecting means 53 shown in FIG. 5, that is a potential at the terminal E/A of the control circuit 52, is changed so as to change the duty ratio and/or frequency of the pulse signal sent to the gate terminal G of the FET 58, which changes the value of the current flowing in the FET 58.

What is claimed is:

1. A discharge lamp lighting circuit comprising:
    a driving means to send out a signal for lighting a discharge lamp;
    a control means to control the driving means;
    a short-circuit protection means to protect the driving means by sending a signal to the control means when the discharge lamp is shorted; and
    an open-circuit protection means to protect the driving means by sending a signal to the control means when the discharge lamp is not lighted, the open-circuit protection means being adapted to send out to control means a signal for limiting a current flowing in the driving means to or below a predetermined value when the tube current is equal to or lower than a first value predetermined, and a signal for sequentially increasing a current flowing in the driving means up to a rated current when the tube current is higher than the first value and also is equal to or lower than a second value predetermined, and adapted to stop a driving signal sent from the control means when a tube current flowing in the discharge lamp has a value equal to or lower than the first value after a predetermined time.

2. The discharge lamp lighting circuit according to claim 1, wherein the open-circuit protection means includes: a current detecting means to detect a tube current flowing in the discharge lamp; a current changing means to operate according to an outcome of detection by the current detecting means thereby changing the tube current flowing in the discharge lamp; and a minimum current detecting means to start its operation at a predetermined time after the outcome of detection by the current detecting means is determined, and wherein a signal for limiting the current flowing in the driving means to or below a predetermined value is sent by the open-circuit protection means to the control means according to an outcome of detection by the current changing means, and a signal for stopping a driving signal sent from the control means is sent by the open-circuit protection means to the control means according to an outcome of detection by the minimum current detecting means after a predetermined time.

3. The discharge lamp lighting circuit according to claim 1, wherein the current changing means sends to the control means a signal for driving the driving means by changing at least one of a duty ratio and a frequency of a pulse signal sent out from the control means thereby increasing the tube current when the tube current is equal to or higher than the first value and also is equal to or lower than the second value, and a signal for stopping the tube current from increasing when the tube current reaches a predetermined value.

4. The discharge lamp lighting circuit according to claim 1, wherein the driving means includes a DC power supply, a switching element to turn on and off a current flowing from the DC power supply, and a transformer having its primary winding connected in series to the switching element, and the current detecting means includes a means to convert into a DC voltage an AC voltage between both ends of a resistor connected in series to a secondary winding of the transformer and the discharge lamp.

5. The discharge lamp lighting circuit according to claim 1, wherein the short-circuit protection means sends out to the control means a signal for stopping the driving signal sent from the control signal when a tube current flowing in the discharge lamp exceeds a predetermined value according to an outcome of detection by the current detecting means.

* * * * *